(12) United States Patent
Ikeda et al.

(10) Patent No.: US 7,890,932 B2
(45) Date of Patent: Feb. 15, 2011

(54) TEST RECORDING METHOD AND DEVICE, AND COMPUTER-READABLE RECORDING MEDIUM STORING TEST RECORDING PROGRAM

(75) Inventors: Hideya Ikeda, Bunkyo (JP); Kentaro Nishimura, Bunkyo (JP); Minoru Yamamoto, Bunkyo (JP)

(73) Assignee: Fujitsu Limited, Kawasaki (JP)

( * ) Notice: Subject to any disclaimer, the term of this patent is extended or adjusted under 35 U.S.C. 154(b) by 1233 days.

(21) Appl. No.: 11/236,635

(22) Filed: Sep. 28, 2005

(65) Prior Publication Data

US 2006/0294434 A1    Dec. 28, 2006

(30) Foreign Application Priority Data

Jun. 28, 2005   (JP) .............................. 2005-189013

(51) Int. Cl.
*G06F 9/44* (2006.01)
*G06F 11/14* (2006.01)

(52) U.S. Cl. ........................ 717/125; 717/103; 717/126; 714/33; 714/38; 714/45

(58) Field of Classification Search ........................ None
See application file for complete search history.

(56) References Cited

U.S. PATENT DOCUMENTS

| | | | | |
|---|---|---|---|---|
| 5,371,883 | A * | 12/1994 | Gross et al. | 714/38 |
| 6,182,245 | B1 * | 1/2001 | Akin et al. | 714/38 |
| 6,966,013 | B2 * | 11/2005 | Blum et al. | 714/38 |
| 7,124,408 | B1 * | 10/2006 | Parthasarathy et al. | 717/170 |
| 7,313,564 | B2 * | 12/2007 | Melamed et al. | 707/101 |
| 7,490,319 | B2 * | 2/2009 | Blackwell et al. | 717/124 |
| 2003/0097650 | A1 * | 5/2003 | Bahrs et al. | 717/124 |

OTHER PUBLICATIONS

Patent Abstracts of Japan, Publication No. 2003-044276 Published Feb. 14, 2003.

* cited by examiner

*Primary Examiner*—Michael J Yigdall
(74) *Attorney, Agent, or Firm*—Fujitsu Patent Center

(57) ABSTRACT

A test recording method capable of preventing omission of tests for software to be delivered. When test input data is entered from a testing client, a data transmitter transmits the data to a testing server. Upon reception of test output data and a hash value from the testing server, an evaluation unit determines a test result, pass or fail, by comparing the test output data with the output pattern described in a test specification. The result recorder stores a test log in a log memory, the test log including the test result and the hash value received from the testing server.

8 Claims, 16 Drawing Sheets

61 TEST INPUT DATA userId=U0001&categories=COMPUTER, POLITICS, MEDICAL
&submit=%83%8D%83O%83C%83%93

FIG. 9

63 RESPONSE

```
    .
    .
    .
<table width="100%">
 <tr>
  <td align="left" width="130"> SEARCH RESULT </td>
  <td align="left" valign="top">
   <table>
    <tr>
     <td id="itemIdList_1" align="left" valign="top">
     CLINICAL TEST
     </td>
    </tr>          63b
    <tr>
     <td id="itemIdList_2" align="left" valign="top">
     NATIONAL TRAP
     </td>
    </tr>          63c
    <tr>
     <td id="itemIdList_3" align="left" valign="top">
     BRAIN PHYSIOLOGY
     </td>
    </tr>          63d
    <tr>
     <td id="itemIdList_4" align="left" valign="top">
     SOFTWARE ENGINEERING
     </td>
    </tr>          63e
   </table>
  </td>
 </tr>
</table>
    .
    .
    .
</body>
</html>
```

TEST RECORDING METHOD AND DEVICE, AND COMPUTER-READABLE RECORDING MEDIUM STORING TEST RECORDING PROGRAM

CROSS-REFERENCE TO RELATED APPLICATIONS

This application is based upon and claims the benefits of priority from the prior Japanese Patent Application No. 2005-189013, filed on Jun. 28, 2005, the entire contents of which are incorporated herein by reference.

BACKGROUND OF THE INVENTION (1) Field of the Invention

This invention relates to a test recording method and device for recording results of testing a program developed based on prescribed design specifications, and a computer-readable recording medium storing a test recording program. More particularly, this invention relates to a test recording method and device, and a computer-readable recording medium storing a test recording program, which can prevent omission of tests.

(2) Description of the Related Art

Generally, large-scale software is built by dispersed development. For example, a software developer (ordering company) which contracts program development entrusts some software houses (contractors) with development of different programs describing partitioned functions. The software developer integrates delivered programs to finalize a software product. Before finalizing, the software developer should test the received programs individually to confirm if they operate as designed. In order to efficiently confirm their qualities, a software development management device has been proposed, which automatically tests if a program meets ordered design specifications, at the time of receiving the program. This makes it possible to stabilize software development (refer to Japanese Unexamined Patent Publication No. 2003-44276).

By the way, in a situation where only the software developer tests programs, if they find a program incomplete, they order modification of the program, resulting in delaying development. Therefore, it would be better that each software house tests programs and then delivers them together with test reports.

To test software that runs in response to user inputs, someone should practically use it. Further, to avoid software integrating all ordered functions from being rejected as an incomplete product, software is delivered for every function. In addition to these circumstances, the following reasons may accidentally cause omission of tests: (1) Dispersed development of software causes more number of modules and complexity of links among the modules. Therefore, if a function is added after the last delivery, it is hardly known what functions should be tested for the modification; and (2) Because of a limited time period, nothing may be done with delivered functions, and therefore retest of them may be omitted even if undelivered functions have links to them.

SUMMARY OF THE INVENTION

This invention has been made in view of foregoing and intends to provide a test recording device and method which record results of testing a program developed based on prescribed design specifications, in order to prevent omission of tests for software to be delivered.

In a preferred embodiment of the invention, a data transmitter transmits test input data entered from a testing client to a testing server provided with a program and an output processing program describing a process for adding a hash value to test output data of the program, the hash value generated from the program. An evaluation unit determines a test result, pass or fail, by comparing the test output data with an output pattern, the test output data output from the testing server running the program in response to the test input data, the output pattern described in a prescribed test specification defining contents of a test. A result recorder records in a log memory a test log including the test result and the hash value generated by the testing server running the output processing program.

The above and other features and advantages of the present invention will become apparent from the following description when taken in conjunction with the accompanying drawings which illustrate preferred embodiments of the present invention by way of example.

BRIEF DESCRIPTION OF THE DRAWINGS

FIG. 9 shows a structure of test input data.
FIGS. 12 and 13 show first and second halves of a data structure of a response.

DESCRIPTION OF THE PREFERRED EMBODIMENTS

A preferred embodiment of this invention will be described with reference to the accompanying drawings.

Figure 1:
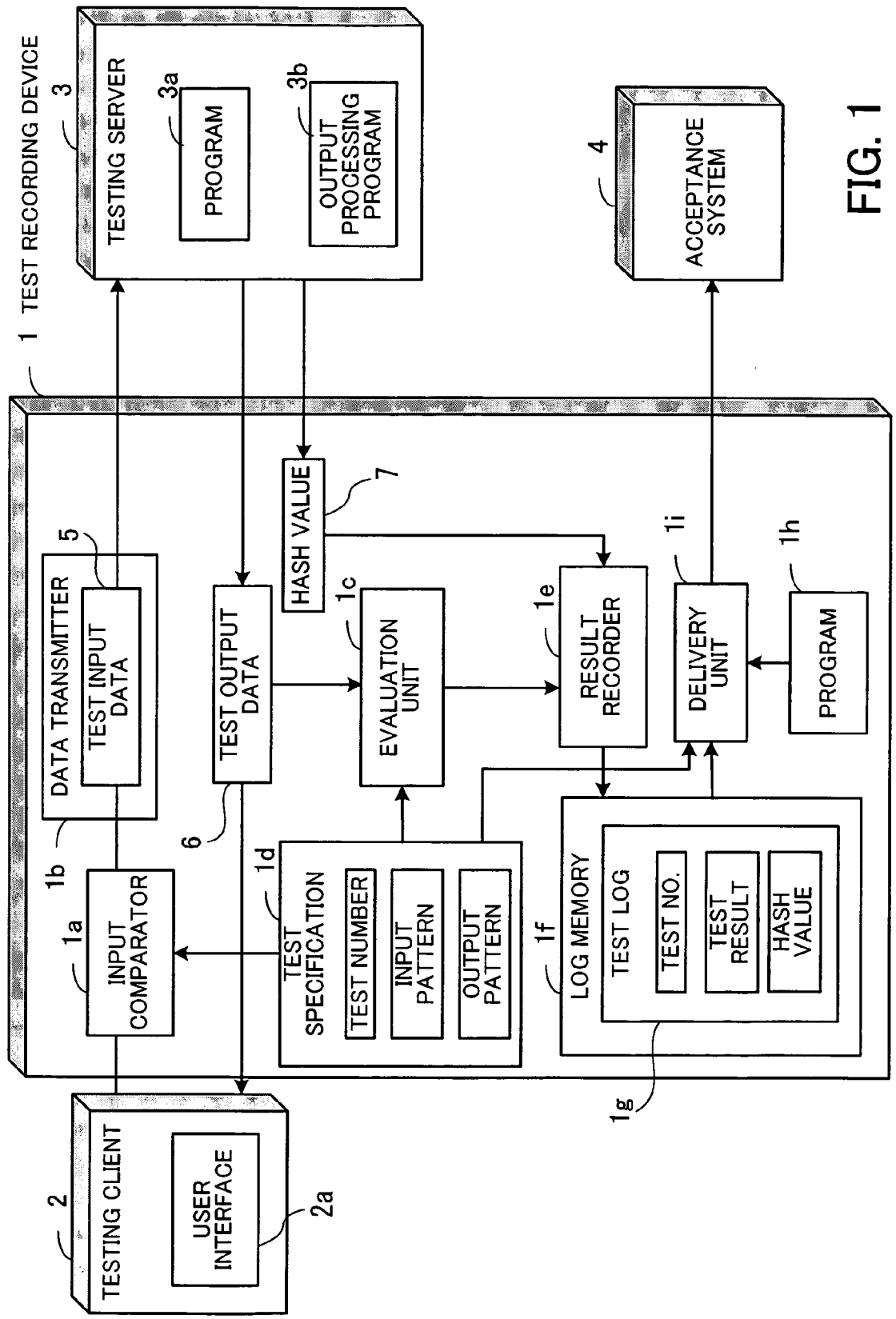
FIG. 1 is a schematic view of one embodiment.

FIG. 1 is a schematic view of the embodiment. Referring to FIG. 1, a test recording device 1 is arranged between a testing client 2 and a testing server 3. The test recording device 1 is also connected to an acceptance system 4 provided in a delivery destination.

The testing client 2 has a user interface 2a for receiving user inputs. The testing server 3 has a test program 3a and an output processing program 3b describing a process for adding a hash value 7 generated from the program 3a to an output of the program 3a.

The test recording device 1 has processing functions including an input comparator 1a, a data transmitter 1b, an evaluation unit 1c, a result recorder 1e, a log memory 1f, and a delivery unit 1i. In addition, in the test recording device 1, a test specification id defining the contents of a test and a program 1h to be delivered are previously stored. The test specification 1d describes a test number, an input pattern showing data to be entered in a test, an output pattern showing data to be output in the test.

The input comparator 1a compares test input data 5 entered from the testing client 2 with the input pattern described in the test specification 1d to find if they match.

The data transmitter 1b transmits the test input data 5 entered from the testing client 2 to the testing server 3. It is noted that the data transmitter 1b may be designed to transmit the test input data 5 to the testing server 3 only when the data 5 meets the test specification 1d.

The evaluation unit 1c determines a test result, pass or fail, by comparing test output data 6 with the output pattern described in the test specification 1d, the test output data 6 output from the testing server 3 running the program 3a in response to the test input data 5.

The result recorder 1e stores in the log memory if a test log 1g including the test result determined by the evaluation unit 1c and a hash value 7 generated by the testing server 3 running the output processing program 3b. The test log 1g includes a test number, a test result (pass or fail), and a hash value, for example.

The delivery unit 1i transmits the program 1h, the test specification 1d, and the test log 1g being stored in the log memory 1f, to the acceptance system 4 of the delivery destination in response to a delivery request. It is noted that the delivery unit 1i may encrypt the test log 1g with a public key.

In the preferred embodiment, the test input data 5 is entered from the testing client 2. The input comparator 1a confirms if the test input data 5 meets the test specification 1d. Then the data transmitter 1b transmits the test input data 5 to the testing server 3. Based on the test output data 6 received from the test server 3, the evaluation unit 1c determines the test result, or if the test program 3a passes the test. The result recorder 1e stores in the log memory 1f the test log 1g including the test result and the hash value 7. When delivery is requested, the delivery unit 1i transmits the program 1h, the test specification 1d, and the test log 1g to the acceptance system 4 of the delivery destination.

According to the above technique, the acceptance system 4 confirms based on the hash value included in the test log 1g that the delivered program 1h is identical to the test program 3a. Specifically, the acceptance system 4 calculates a hash value from the program 1h with the same algorithm as the output processing program 3b. When the calculated hash value is the same as the hash value included in the test log 1g, the acceptance system 4 can confirm that the test log 1g surely shows the test result of the program 1h.

Generally, many different versions of programs are created at a development stage. By creating a test log including a hash value for each test, a program corresponding to the test log can be specified based on the hash value. That is, it can be guaranteed that a package of the latest version has been tested without fail, and tests cannot be omitted.

This embodiment will be now described in more detail. Generally, software is a set of plural programs and is referred to as a package in the following description.

Figure 2:
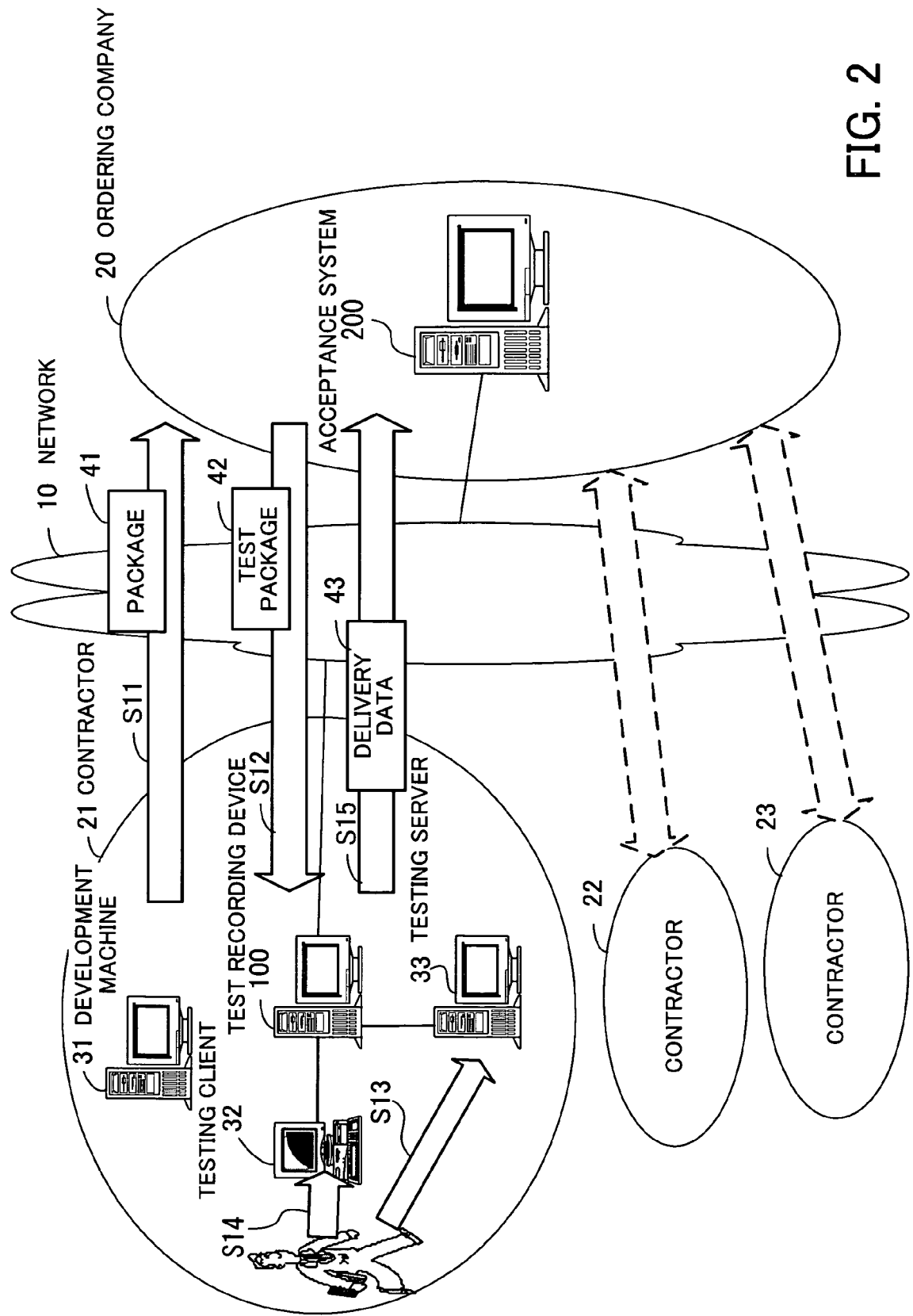
FIG. 2 shows a system configuration of the embodiment.

FIG. 2 shows a system configuration of this embodiment. This figure shows a dispersed development case where an ordering company 20 entrusts some contractors 21 to 23 with development of software for different functions.

The ordering company 20 has an acceptance system 200. The acceptance system 200 is a computer which checks if programs delivered from the contractors 21 to 23 are acceptable. When the acceptance system 200 first receives a software package 41 from the contractor 21, it creates a test package 42 by modifying the package 41 so as to output a response including a hash value calculated from the package 41.

The contractor 21 has a development machine 31, a testing client 32, a testing server 33, and a test recording device 100. The development machine 31 is a computer which develops a software package 41. The testing client 32 is a computer which displays user inputs and output data while a test package 42 is tested. The testing server 33 is a computer which runs a test package. The test recording device 100 is connected to the acceptance system 200 via a network 10. The test recording device 100 is arranged between the testing client 32 and the testing server 33, and transfers input data and output data between them. Further, the test recording device 100 determines a test result by analyzing the input data and the output data. Furthermore, the test recording device 100 transmits delivery data 43 to the acceptance system 200 after the test package 42 is tested, the delivery data 43 including the test package 42 and a test report showing the test result.

This system operates as follows. The contractor 21 first gives the ordering company 20 the software package 41 created by the development machine 31 (step S11). The acceptance system 200 creates and returns the test package 42 to the contractor 21 (step S12). This test package 42 is designed to output a response including a hash value generated from the package 41 in response to a test input. The contractor 21 installs the test package 42 in the testing server 33 (step S13) and tests the package 42 with the testing client 32 (step S14). Upon reception of a response including the hash value from the testing server 33, the test recording device 100 creates a test report which is associated with the test package 42 by the hash value. Then the contractor 21 gives the ordering company 20 the delivery data 43 including the test report and the test package (step S15). The ordering company 20 enters the delivery data 43 in the acceptance system 200 to find if the software package is acceptable. At this time, the acceptance system 200 confirms based on the hash value if the test package 42 included in the delivery data 43 has been tested without fail. This means that it can be automatically confirmed if a required test has been conducted on the latest package.

The above process is repeated until the software package has a required quality. That is, if a test result shows that a package has a poor quality, a processing loop from step S11 to step S15, including retry of the test, should be repeated.

Figure 3:
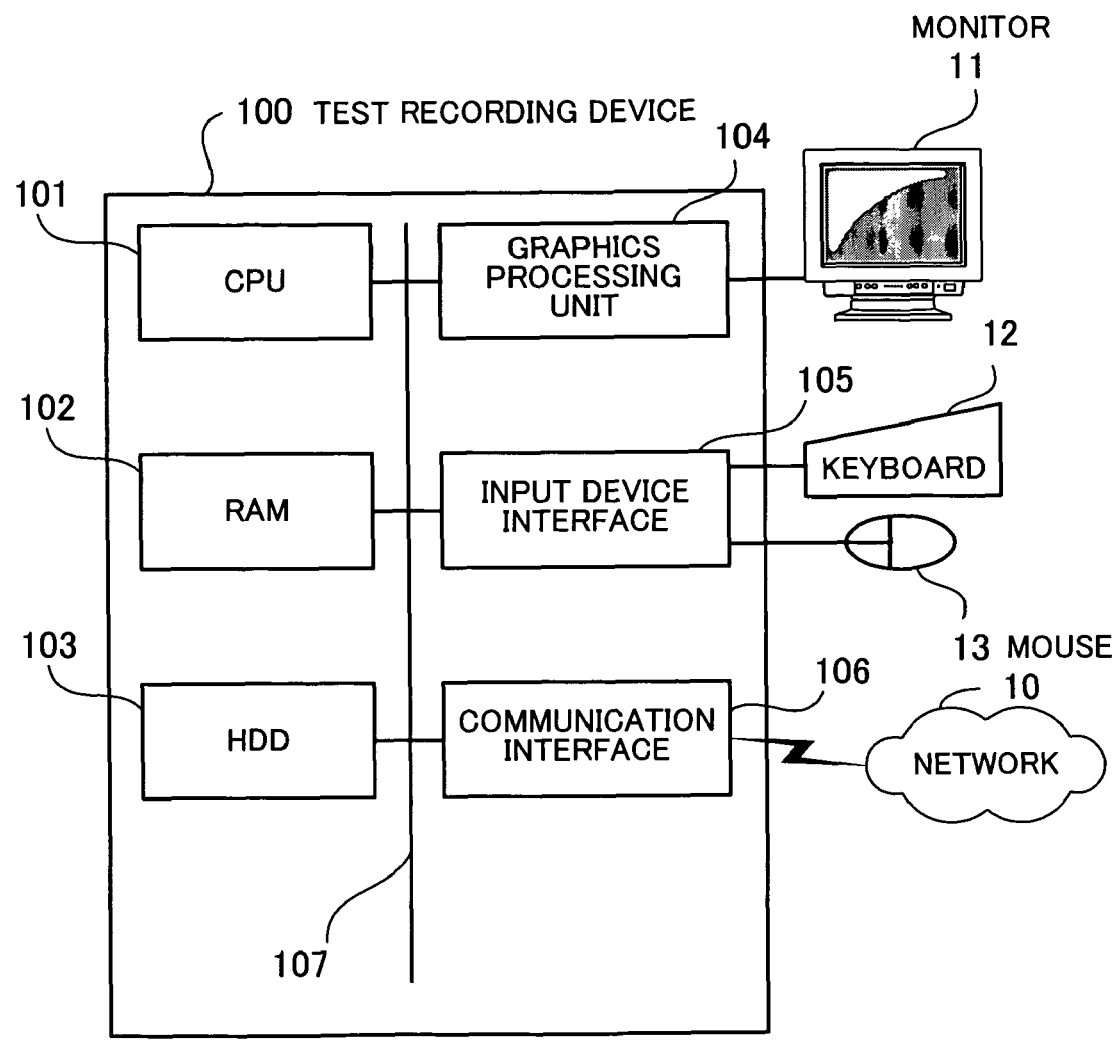
FIG. 3 shows a hardware configuration of a test recording device according to the embodiment.

FIG. 3 shows a hardware configuration of the test recording device according to this embodiment. The test recording device 100 is entirely controlled by the Central Processing Unit (CPU) 101. The CPU 101 is connected to a Random Access Memory (RAM) 102, a Hard Disk Drive (HDD) 103, a graphics processing unit 104, an input device interface 105, and a communication interface 106 via a bus 107.

The RAM 102 temporarily stores part of an Operating System (OS) program and application programs to be run by CPU 101. The RAM 102 also stores various data for CPU processing. The HDD 103 stores the OS and application programs.

The graphics processing unit 104 is connected to a monitor 11. The graphics processing unit 104 displays images on the monitor 11 under the control of the CPU 101. The input device interface 105 is connected to a keyboard 12 and a mouse 13. The input device interface 105 transfers signals from the keyboard 12 and the mouse 13 to the CPU 101 via the bus 107.

The communication interface 106 is connected to the network 10 to communicate data with other computers over the network 10.

With the hardware configuration, the processing functions of this embodiment can be implemented. While FIG. 3 shows the hardware configuration of the test recording device 100, the acceptance system 200, the development machine 31, the testing client 32, and the testing server 33 can have the same configuration.

The processing functions of the acceptance system 200 and the test recording device 100 will be described with reference to FIGS. 4 and 5.

Figure 4:
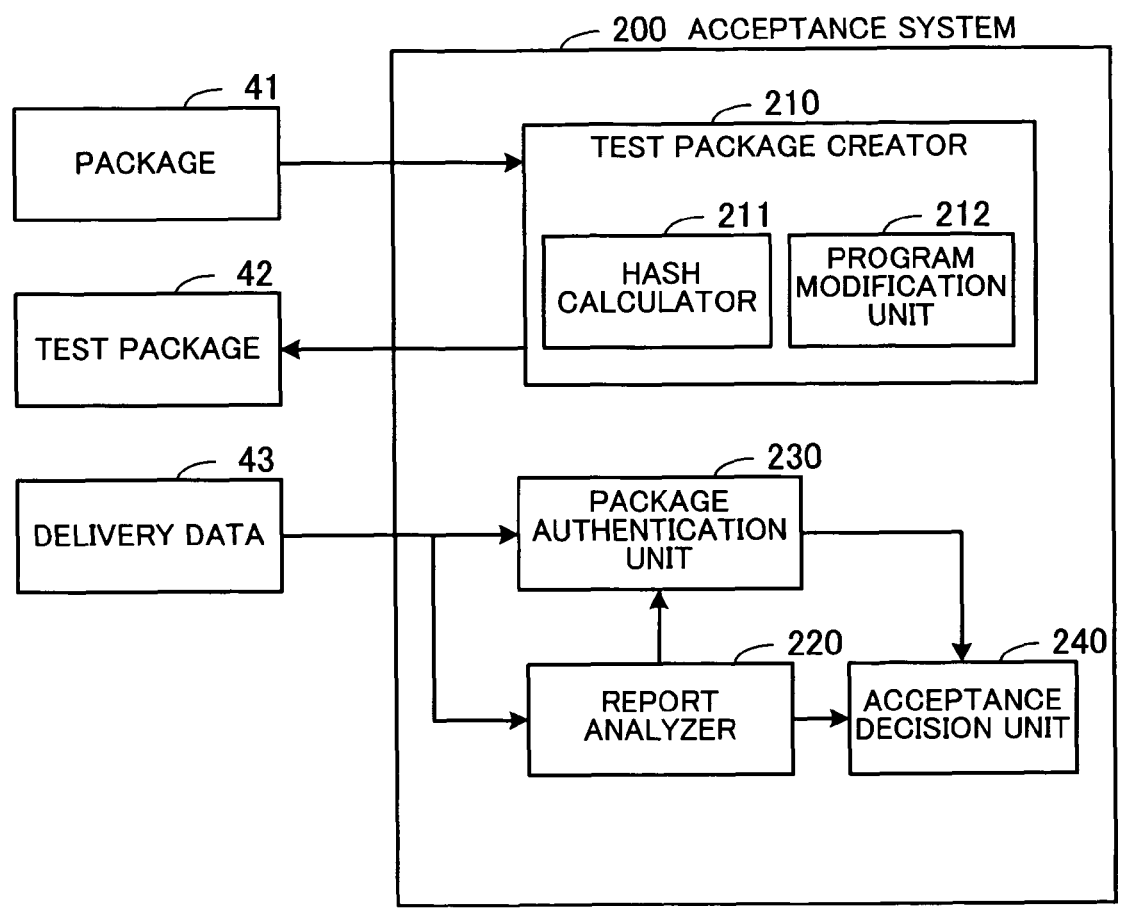
FIG. 4 is a functional block diagram of an acceptance system.

FIG. 4 is a functional block diagram of the acceptance system. The acceptance system 200 has a test package creator 210, a report analyzer 220, a package authentication unit 230, and an acceptance decision unit 240.

The test package creator 210 receives a package 41 and creates a corresponding test package 42. For this purpose, the test package creator 210 has a hash value calculator 211 and a program modification unit 212. The hash value calculator 211 calculates a hash value from the received package 41. The program modification unit 212 creates the test package 42 by modifying the package 41 so as to output a response including the hash value.

The report analyzer 220 extracts and analyzes a test report from delivery data 43. The report analyzer 220 extracts and gives a hash value from the test report to the package authentication unit 230. The report analyzer 220 gives a test log from the test report to the acceptance decision unit 240.

The package authentication unit 230 extracts the package 41 from the test package 42 included in the delivery data 43 and calculates a hash value. The package authentication unit 230 finds if the test package 42 has been tested without fail, depending on whether the calculated hash value matches the hash value received from the report analyzer 220. When these hash values match, the package authentication unit 230 notifies the acceptance decision unit 240 that the test report is reliable.

When the acceptance decision unit 240 receives a reliable report notification from the package authentication unit 230, it calculates a correct output rate from the test log and checks if the package 41 has an acceptable quality. For this decision, a threshold value for the correct output rate is set, for example. A relatively low threshold value is set at an initial stage, and then a higher threshold value is set with progressing in development. Thereby software gradually gets higher quality.

Figure 5:
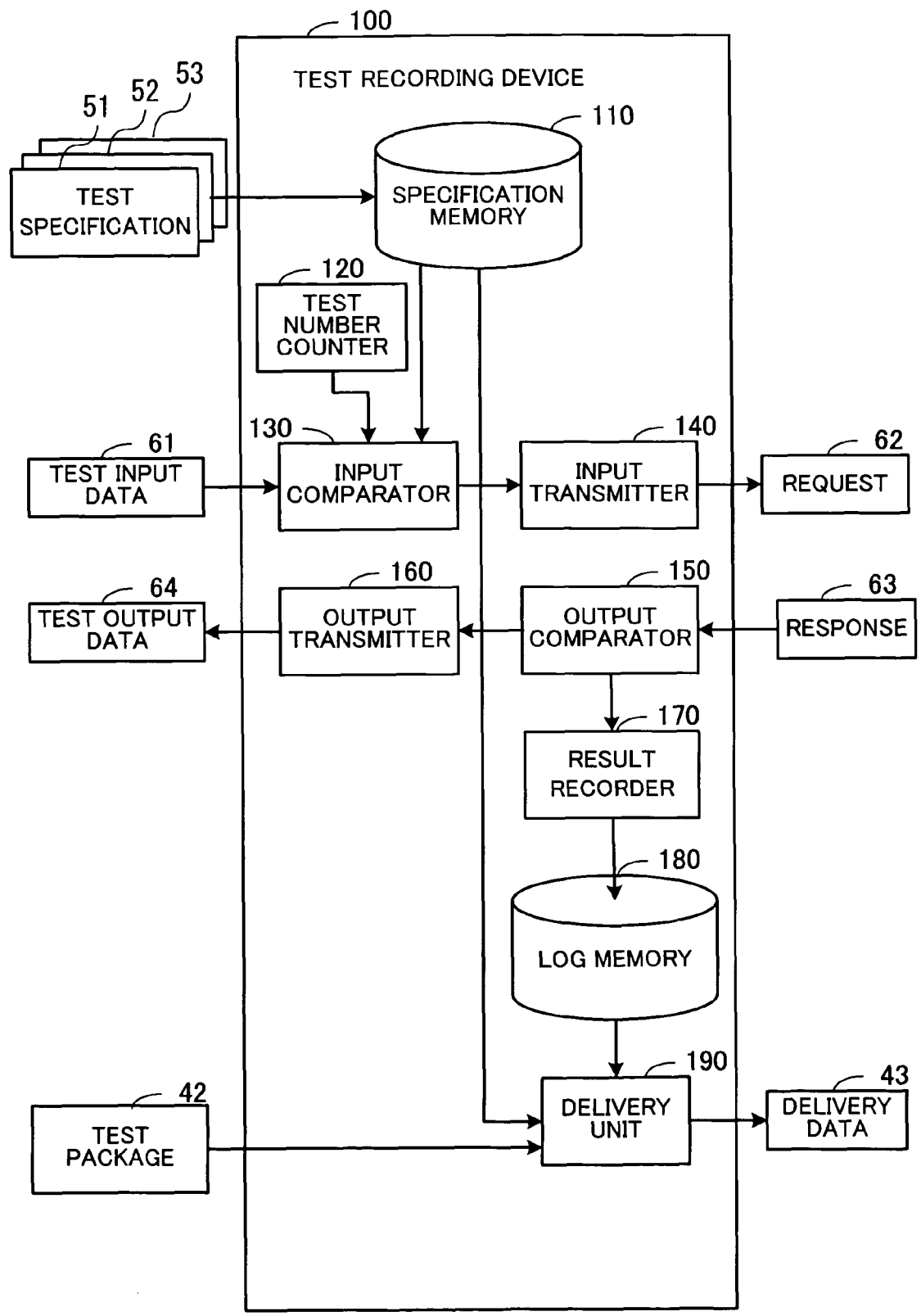
FIG. 5 is a functional block diagram of the test recording device.

FIG. 5 is a functional block diagram of the test recording device. The test recording device 100 has a specification memory 110, a test number counter 120, an input comparator 130, an input transmitter 140, an output comparator 150, an output transmitter 160, a result recorder 170, a log memory 180, and a delivery unit 190.

The specification memory 110 stores test specifications 51, 52 and 53, each of which defines the contents of a test and is given a test number. In this embodiment, the test package 42 is tested in order of test number.

The test number counter 120 shows the test number of a current test. This test number counter 120 is incremented every time when one test starts.

The input comparator 130 receives test input data 61 from the testing client 32 and compares this data 61 with the test specification of the current test. The current test can be specified with reference to the test number counter 120. The input comparator 130 gives the comparison result to the input transmitter 140. When the comparison result shows match, the input transmitter 140 creates a request 62 including the test input data with the address and port number of the testing server 33 specified as a destination, and sends it to the testing server 33.

When the output comparator 150 receives a response 63 from the testing server 33, it extracts test output data 64 and a hash value 7 from the response 63. The output comparator 150 determines a test result, pass or fail, based on the test output data 64 and gives this result to the result transmitter while giving the test output data 64 to the output transmitter 160. The output transmitter 160 transmits the received test output data 64 to the testing client 32.

The result recorder 170 creates and stores a test log in the log memory 180, the test log including the test result and the hash value 7. The log memory 180 is a storage medium to store a test log that is created for every test.

The delivery unit 190 receives the test package 42, retrieves the test specifications for this package 42 from the specification memory 110, and also retrieves the test logs for the package 42 from the log memory 180. Then the delivery unit 190 creates delivery data 43 including the test package 42, the test specifications, and the test logs, and sends it to the acceptance system 200.

The acceptance system 200 and the test recording device 100 having the functions shown in FIGS. 4 and 5 allow the ordering company 20 to correctly confirm test results for a delivered package.

Figure 6:
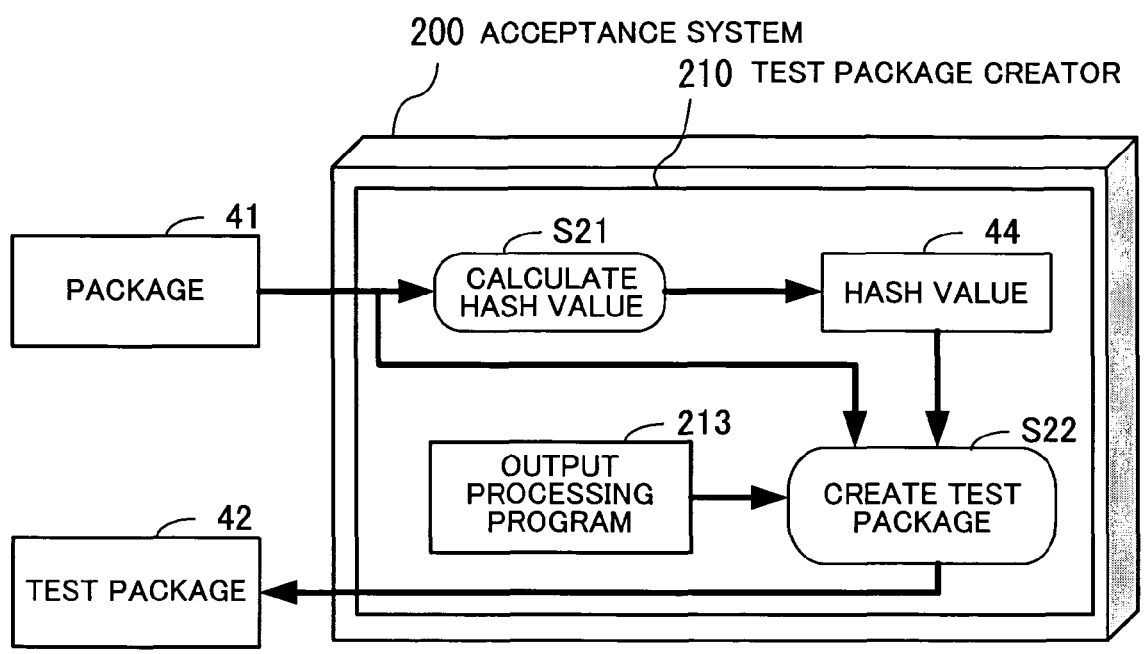
FIG. 6 shows a process of creating a test package.

Following is about a process for delivering a package. First a process of creating the test package 42 will be described with reference to FIG. 6.

When the acceptance system 200 first receives the package 41 from the contractor 21, the hash value calculator 211 calculates a hash value 44 from the package 41 (step S21). It should be noted that even a slightly modified package produces a different hash value. The calculated hash value 44 and the package 41 are given to the program modification unit 212, which then creates the test package 42 (step S22). Specifically, the program modification unit 212 modifies the package 41 by including the output processing program 213 describing a process for outputting a response including the hash value 44 in response to a request. Thus created test package 42 is returned to the contractor 21.

Figure 7:
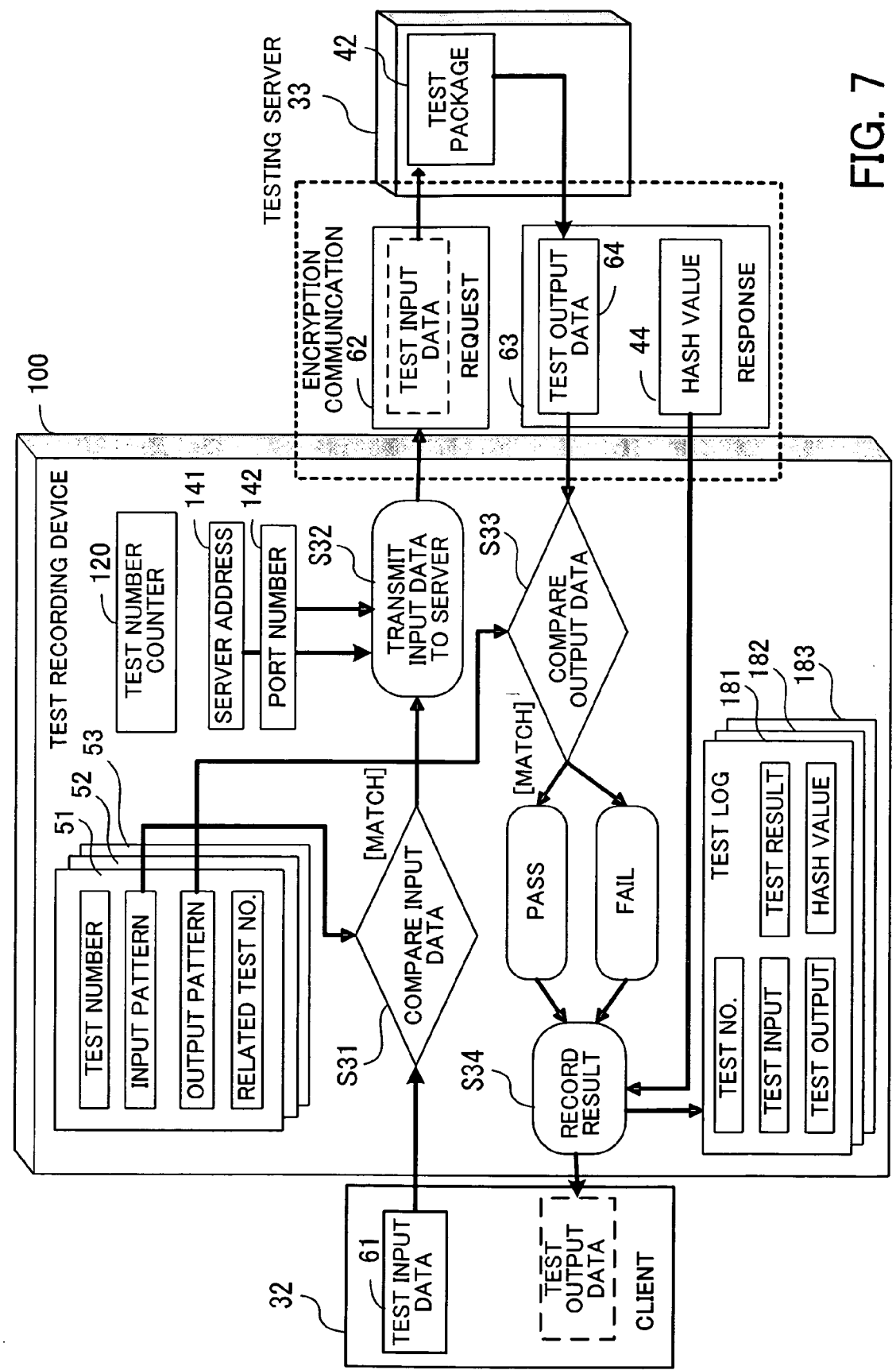
FIG. 7 shows a test process.

A process for testing the test package 42 will be now described with reference to FIG. 7.

To conduct tests, the test package 42 is installed in the testing server 33. The contractor 21 manually sets the environment of the testing server 33 (or automatically sets some items, if possible, with OS functions) so that the package 42 practically operates. In addition, the contractor 21 initializes the test number counter 120 and then starts the tests. For example, the contractor 21 sets the test number counter 120 to "1" when conducting all the tests (under a condition where the test number starts with "1"). When the contractor 21 starts the tests in the middle, they set the test number counter 120 to the test number of a starting test.

The contractor 21 enters data according to a test specification with the testing client 32. Assume now that the test package 42 is application software that uses a Web server. The testing client 32 starts a Web browser. The contractor 21 enters data according to a test specification on the Web browser window. Then the testing client 32 transmits the test input data 61 to the test recording device 100.

The test input data 61 is received by the input comparator 130. This input comparator 130 recognizes the test number of the current test from the value of the test number counter 120. The input comparator 130 retrieves the test specification with the test number from the specification memory 110.

Each of the test specifications 51, 52, and 53 describes a test number, an input pattern, an output pattern, and a related test number. The test number is a number given to each test specification in order of test execution. The input pattern defines test input data to be entered. The output pattern defines information to be output. The related test number is the test number of a test that should be conducted before.

The input comparator 130 compares the test input data 61 with the input pattern described in the obtained test specification to determine if they match (step S31). Mismatch means an error. When they match, on the contrary, the input comparator 130 next determines whether the test specified by the related test number has been completed, based on whether the log memory 180 stores a test log for the test. Absence of the test log means an error. When such a test log exists, on the contrary, the input comparator 130 gives the test input data 61 to the input transmitter 140. The input transmitter 140 creates a request 62 including the test input data 61 with the server address 141 and port number 142 of the preset testing server 33 specified as a destination. The input transmitter 140 then transmits the created request 62 to the testing server 33 (step S32).

When the testing server 33 receives the request 62, this server 33 runs the test package 42 in response to the included test input data 61, and creates a response 63 including test output data 64 and the hash value 44, the test output data 64 indicating a response to the test input data 61, the hash value 44 generated by the output processing program. The testing server 33 returns the response 63 to the test recording device 100.

In the test recording device 100, the output comparator 150 extracts the test output data 64 from the response 63 and determines a test result (step S33). Specifically, the output comparator 150 extracts the output pattern from the test specification being stored in the specification memory 110. The output comparator 150 compares the test output data 64 with the output pattern. Match means pass while mismatch means fail. This test result is passed to the result recorder 170. The test recorder 170 creates and stores a test log based on the test result in the log memory 180 (step S34). At this time, the test recorder 170 extracts the hash value 44 from the response 63 and includes it in the test log.

Each test log 181, 182, 183 includes a test number, a test input, a test output, a test result, and a hash value. The test number is a number given to the test specification of a conducted test. The test input is test input data entered in the test. The test output is test output data output in the test. The test result is a test result determined by the output comparator 150. The hash value is a hash value included in the response 63.

Then the output transmitter 160 transmits the test output data 64 to the testing client 32. The testing client 32 displays the test output data 64.

The test recording device 100 and the testing server 33 communicate with each other with an encryption technique such as Secure Socket Layer (SSL), in order to prevent dishonest actions of contractors such as change of hash values.

Figure 8:
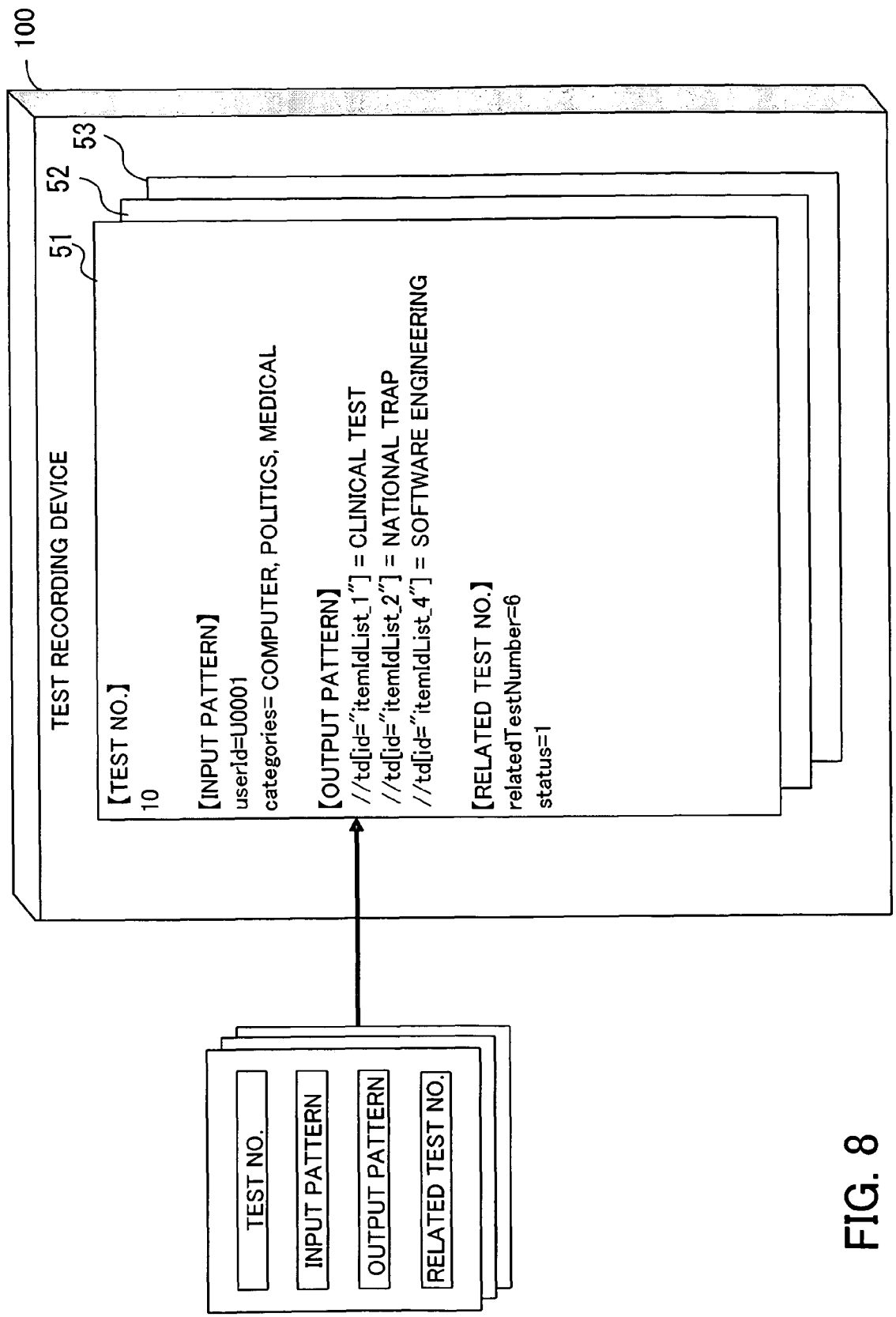
FIG. 8 shows a test specification.

The quality check is done as described above. The contents of a test will be now described in detail. FIG. 8 shows the contents of the test specification 51 as an example. When a set of test specifications 51, 52 and 53 required for quality check of the test package 42 is entered in the test recording device 100, they are stored in the specification memory 110 in an increasing order of test number.

As shown in this figure, the test specification 51 is created as one text. The specification 51 describes a test number, an input pattern, an output pattern, and a related test number.

By the way, there are two ways of writing an input pattern or an output pattern. One is a writing way of simply repeating "key=value", like "key1=value1 & key2=value2 & ...". The other is a writing way such as XPath which allows keys of an input pattern or an output pattern to be specified in test input/output data written in a hierarchical structure, in XML for example. This example employs the former one.

The related test number includes the test number of a related test specification and the status of the related test. The status indicates when a related test should be conducted. In this example, status "0" means that a related test should be conducted most recently while status "1" means that a related test should be conducted before.

FIG. 9 shows a structure of test input data. This test input data 61 is data entered according to the test specification 51. In this example, this test input data 61 includes "userID" and "categories" keys. For these keys, values, i.e., "U0001" and "computer, politics, medical" are set. These values are entered by the contractor 21 to the testing client 32 with the keyboard. The test input data 61 has various flags following "submit" key. This "submit" key is automatically given by a script program running in the testing client 32.

Figure 10:
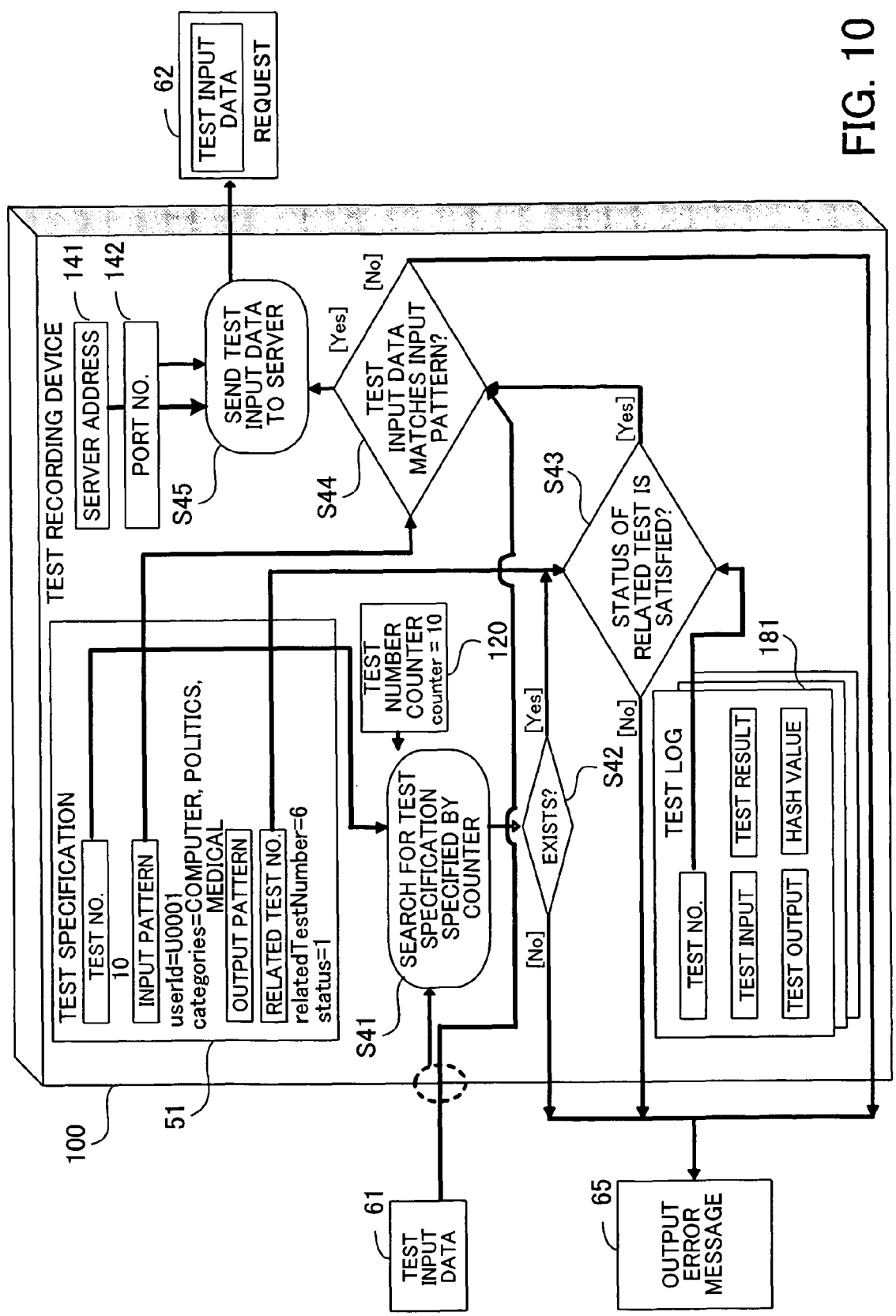
FIG. 10 shows a comparison process of test input data.

A process to compare test input data will be now described with reference to FIG. 10. This figure shows a case where the test number counter 120 is "10" and a test is conducted according to the test specification 51. In addition, the test input data 61 of FIG. 9 is used as test input data.

When the test input data 61 is entered in the test recording device 100 from the testing client 32, the input comparison process starts. The input comparator 130 searches the specification memory 110 for the test specification with the test number specified by the test number counter 120 (step S41). When no such a test specification exists, the input comparator 130 outputs an error message to the testing client 32. When the input comparator 130 finds the test specification, then it proceeds to compare the test input data 61 (step S42). The input comparator 130 retrieves the test specification 51 with the test number ("10" in this example) from the specification memory 110 and checks if the status in the related test number is satisfied (step S43). Specifically, when the status is "0", the input comparator 130 checks if a value obtained by subtracting one from the value of the test number counter 120 is equal to the related test number. When the status is "1", the input comparator 130 searches the log memory 180 for a test log for the test of the related test number.

This example shows that the related test number is "6" (relatedTestNumber=6) and the status is "1". This means that a test according to the test specification with the test number "6" should be conducted before. Therefore, the input comparator 130 searches the log memory 180 for the test log with the test number "6". Existence of such a test log means that the test of the test number was conducted before.

When the status is unsatisfied, the test comparator 130 transmits an error message to the testing client 32. When the status is satisfied, on the contrary, the input comparator 130 compares the input pattern described in the test specification 51 with the test input data 61 to find if they match (step S44). Specifically, the input comparator 130 extracts all keys of the input pattern from the test specification 51. In this example, "userID" and "categories" are obtained. Then the input comparator 130 extracts values corresponding to the obtained keys from the test input data. In this example, "U0001" and "computer, politics, medical" are obtained as corresponding values. The input comparator 130 compares the extracted values with the corresponding values of the input pattern to find if they all match. If the test input data has keys other than those specified by the input pattern, the input comparator 130 ignores the keys. If there are one or more mismatches, the input comparator 130 transmits an error message to the testing client 32. If they all match, on the contrary, the input comparator 130 informs the input transmitter 140 of this matter. Then the input transmitter 140 creates and sends to the testing server 33 a request 62 with the server address 141 and port number 142 of the testing server 33 specified as a destination (step S45).

Figure 11:
FIG. 11 shows a data structure of a request.

FIG. 11 shows a data structure of an HTTP request 62. The request 62 includes the same information 62a as the test input data 61. When the testing server 33 receives the request 62, it runs the test package 42 in response to the request 62 and returns a response 63.

The contents of the response 63 will be now described with reference to FIGS. 12 and 13 which show the first and second halves of the data structure of the response.

Figure 12:
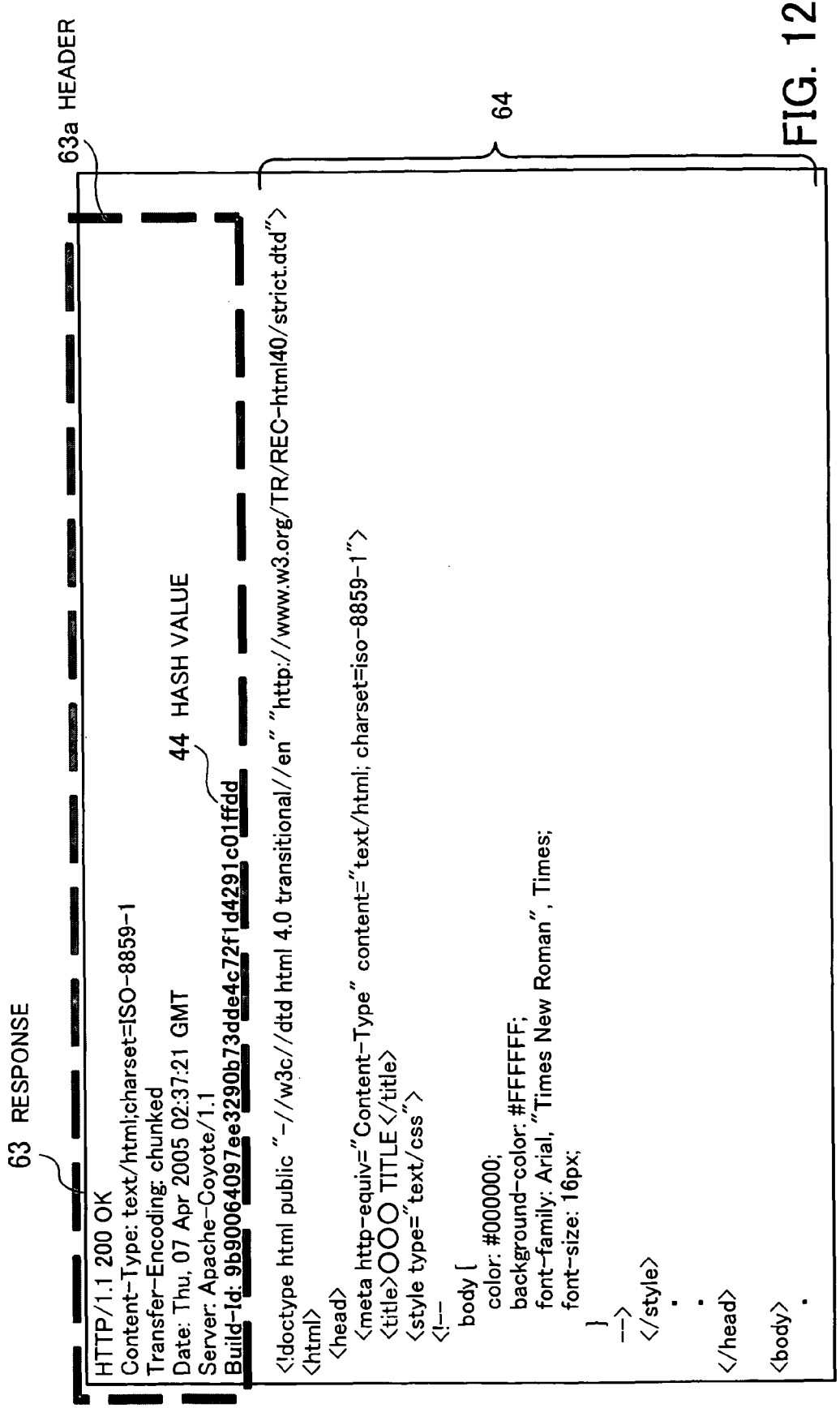

Referring to FIG. 12, a hash value 44 is inserted in the header 63a of the response 63. An HTML body after the header 63a is test output data 64. As can bee seen from FIG. 13, this HTML body includes resultant character strings 63b to 63e.

When the testing server 33 transmits this response 63 to the test recording device 100, this test recording device 100 starts a process for creating a test log.

Figure 14:
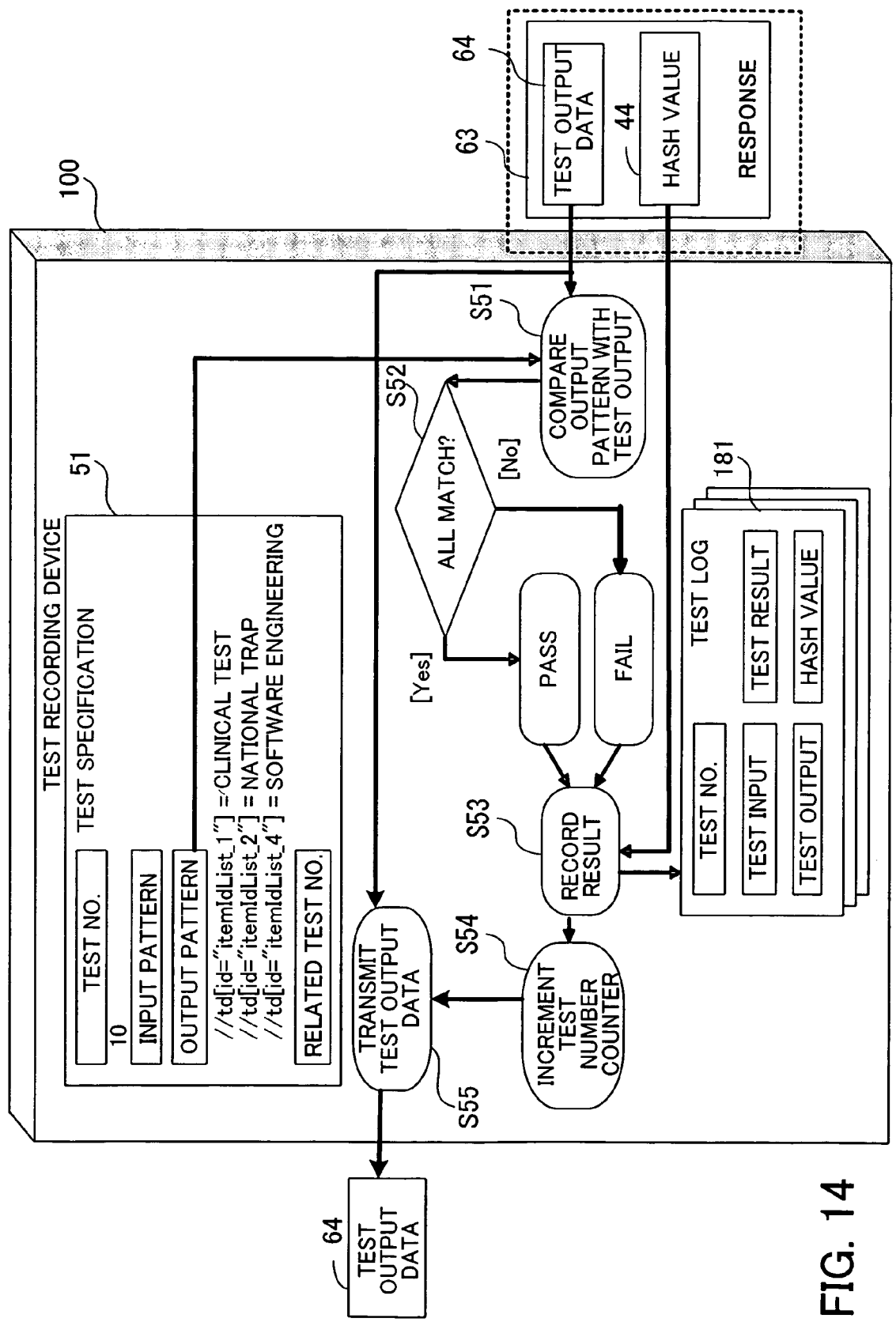
FIG. 14 shows a process for creating a test log.

FIG. 14 shows how a test log is created. When the test recording device 100 receives a response 63, the output comparator 150 compares test output data with an output pattern (step S51). Specifically, the output comparator 150 extracts all keys of the output pattern from the test specification 51 of the current test. In this example. "//td[id="itemIdList_1"]", "//td[id="itemIdList_2"]", and "//td[id="itemIdList_4"]" are extracted. Then the output comparator 150 extracts the values corresponding to the extracted keys from the test output data 64 included in the response 63. Therefore, from the response 63 of FIG. 13, "clinical test", "national trap", and "software engineering" are obtained as values corresponding to "//td[id="itemIdList_1"]", "//td[id="itemIdList_2"]", and "//td[id="itemIdList_4"]" keys, respectively. Then the output comparator 150 checks if the extracted values all match the preset values (step S52). All match means pass while one or more mismatches mean fail. If the test output data 64 includes keys other than those set as the output pattern, the output comparator 150 ignores the keys.

After the comparison, the result recorder 170 stores a test log 181 showing the test result in the log memory 180 (step S53). In the test log 181, the value of the test number counter 120, the test input data 61, the test output data 64, the test result (pass or fail), and the hash value 44 included in the response 63 are set as a test number, a test input, a test output, a test result, and a hash value.

Then the test result recorder 170 increments the test number counter 120 by one. In this example, the counter value "10" is incremented by one to "11" (step S54). Then the output transmitter 160 transmits the test output data 64 to the testing client 32 (step S55).

Quality check is sequentially conducted according to the prepared test specifications 51, 52 and 53, resulting in creating the test logs 181, 182 and 183. When the contractor 21 completes this check for the test package 42, they deliver the package 42 to the acceptance system 200.

Figure 15:
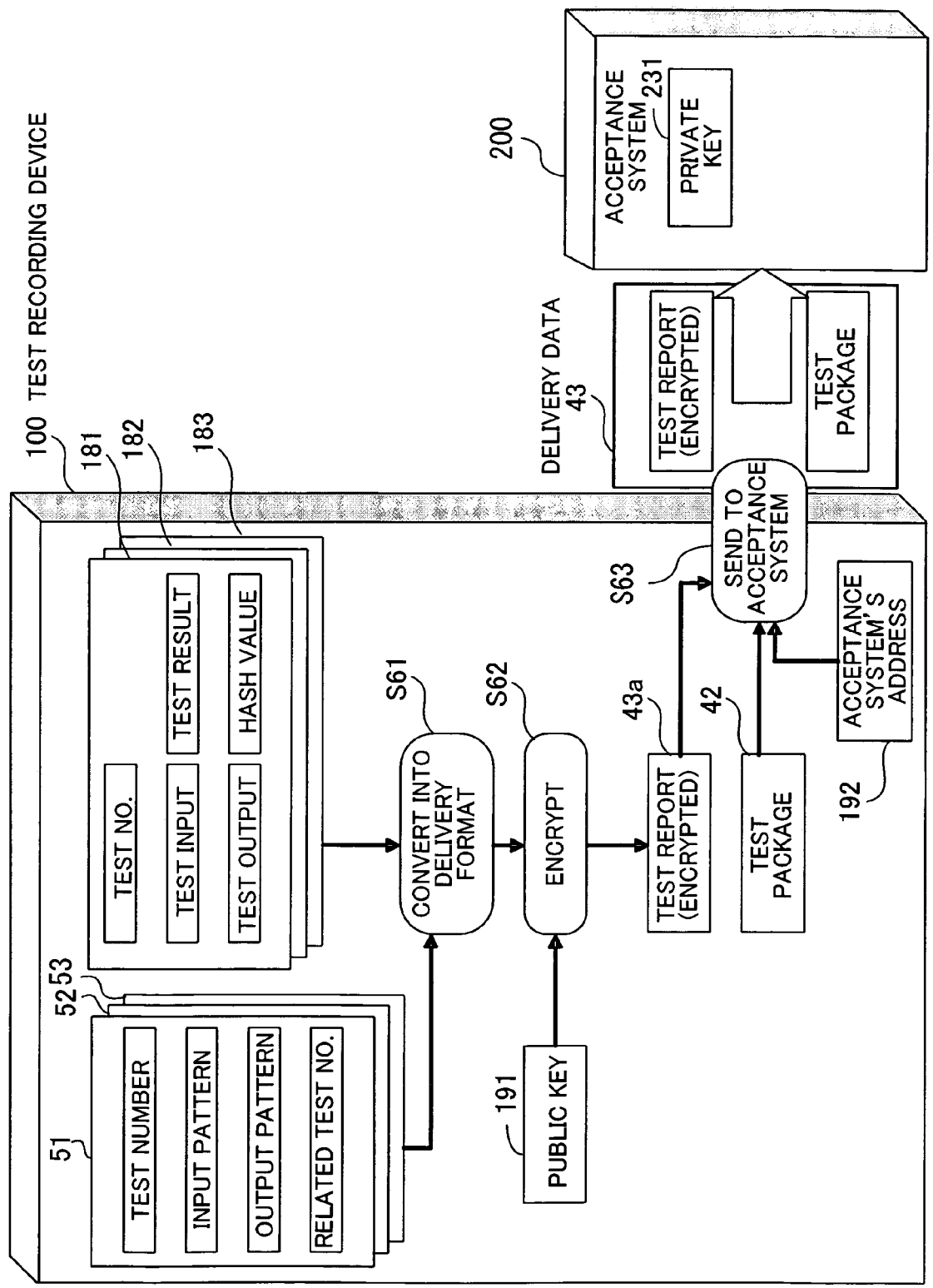
FIG. 15 shows a delivery process.

FIG. 15 shows a delivery process. The contractor 21 stores the test package 42 in a computer-readable recording medium from the test recording device 100. When the contractor 21 enters a delivery command into the test recording device 100, the delivery unit 190 of the device 100 starts the delivery.

The delivery unit 190 first converts a set of the test specifications 51, 52 and 53 and a set of the test logs 181, 182 and 183 into a prescribed delivery format altogether (step S61). Then the delivery unit 190 encrypts the formatted data with a prescribed public key 191 to create a test report 43a (step S62). The delivery unit 190 transmits delivery data 43 to the address 192 of a registered acceptance system, the delivery data 43 including the encrypted test report 43a and the test package 42 (step S63).

The acceptance system 200 has a private key 231 for the public key 191 so as to decode the test report 43a with this key 231.

Figure 16:
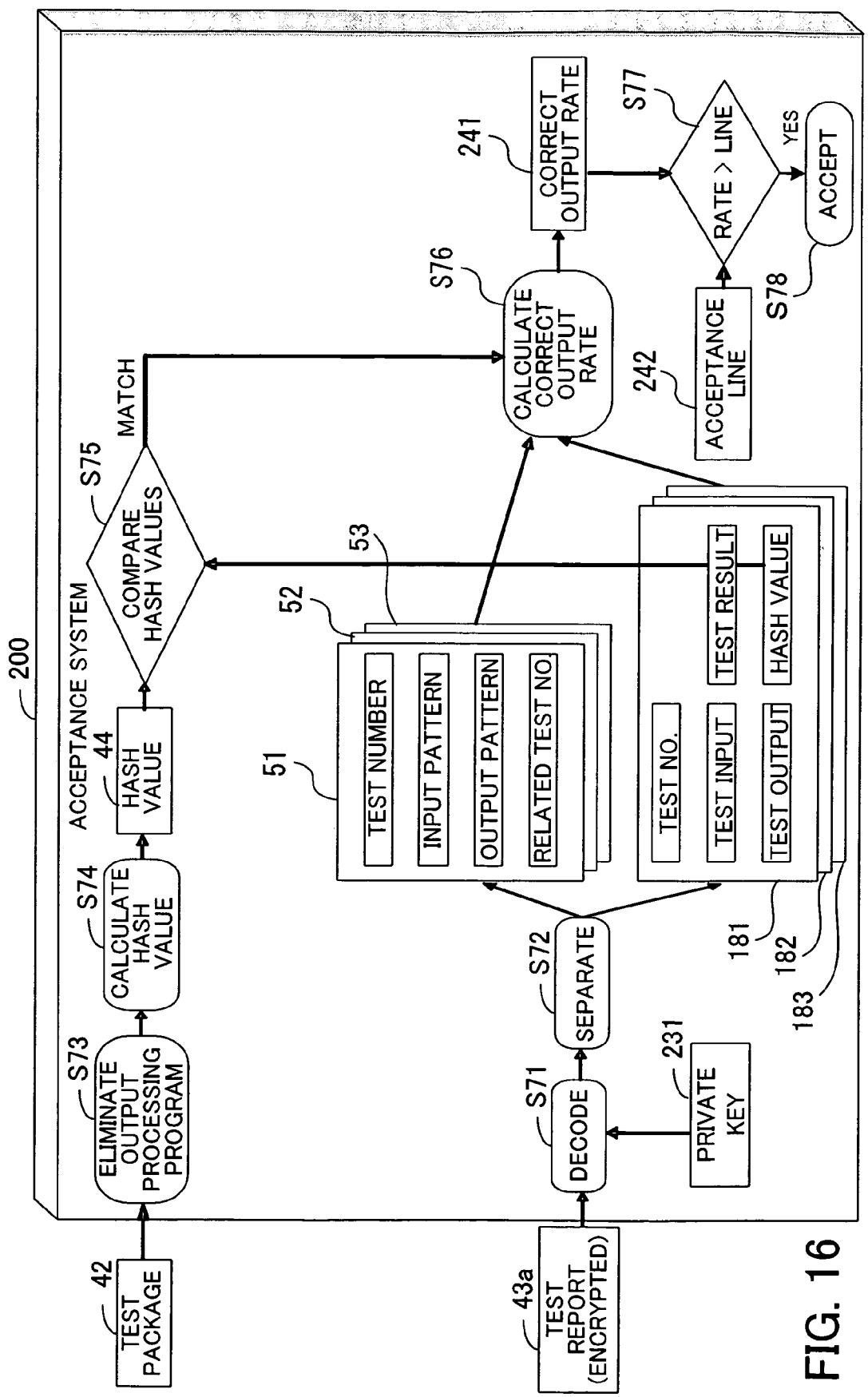
FIG. 16 shows how an acceptance system accepts a package.

FIG. 16 shows how the acceptance system accepts delivery. The report analyzer 220 decodes the test report 43a of the delivery data 43 with the private key 231 (step S71). The report analyzer 220 then separates the decoded data into a set of the test specifications 51, 52 and 53 and a set of the test logs 181, 182 and 183 (step S72).

The package authentication unit 230 extracts the test package 42 from the delivery data 43, and eliminates the output processing program from the test package 42 (step S73) to restore the package 41. Then the package authentication unit 230 calculates a hash value 44 from the package 41 (step S74). The package authentication unit 230 compares the calculated hash value 44 and the hash value received from the report analyzer 220. When they match, the package authentication unit 230 notifies the acceptance decision unit 240 that the test report is reliable (step S75).

The acceptance decision unit 240 calculates the total number of conducted tests based on the test specifications 51, 52 and 53, and extracts the test results from the test logs 181, 182 and 183. The acceptance decision unit 240 devides the number of passed tests by the total number of tests to calculate a correct output rate (step S76). Further, the acceptance decision unit 240 compares a preset acceptance line 242 with the correct output rate 241 (step S77). The acceptance decision unit 240 determines that the package 41 has an acceptable quality and accepts this package 41 when the correct output rate is greater than the acceptance line (step S78).

As described above, it can be confirmed that the delivered package 41 has been tested without fail. Therefore, easy quality management of development software can be realized.

By the way, a delivered package is checked in view of the three points: (1) testing performance; (2) test in consistent environments; and (3) correspondence between test results and a package. Item (1) is the one which both sides have agreed about, and item (3) is guaranteed by test execution according to this embodiment. Therefore, it can be recognized that troubles after delivery come from insufficient environmental consistency (item (2)). The testing performance (item (1)) can be automatically evaluated based on a correct output rate. In this embodiment, the ordering company accepts the package 41 when a correct output rate is greater than a prescribed acceptance line, i.e., even if it does not pass all tests. This is because exploratory operation of software under development may be useful for specification change and bug detection, resulting in making the software better.

The processing functions described above can be realized by a computer. In this case, a program is prepared, which describes processes for performing the functions of the test recording device or the acceptance system. The program is executed by a computer, whereupon the aforementioned processing functions are accomplished by the computer. The program describing the required processes may be recorded on a computer-readable recording medium. Computer-readable recording media include magnetic recording devices, optical discs, magneto-optical recording media, semiconductor memories, etc. The magnetic recording devices include hard disk drives (HDD), flexible disks (FD), magnetic tapes, etc. The optical discs include digital versatile discs (DVD), DVD-Random Access Memories (DVD-RAM), compact disc read-only memories (CD-ROM), CD-R (Recordable)/

RW (ReWritable), etc. The magneto-optical recording media include magneto-optical disks (MO) etc.

To distribute the program, portable recording media, such as DVDs and CD-ROMs, on which the program is recorded may be put on sale. Alternatively, the program may be stored in the storage device of a server computer and may be transferred from the server computer to other computers through a network.

A computer which is to execute the program stores in its storage device the program recorded on a portable recording medium or transferred from the server computer, for example. Then, the computer runs the program. The computer may run the program directly from the portable recording medium. Also, while receiving the program being transferred from the server computer, the computer may sequentially run this program.

According to this invention, a hash value generated from a program is included together with a test result of the program in a test log. Based on this hash value, it can be confirmed that the test log surely shows a test result of the program. As a result, untested programs cannot be delivered, which means that omission of tests for a program can be prevented.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A test recording method for recording a result of testing a program developed based on prescribed design specifications, comprising:
   detecting if a related test was conducted most recently, the related test specified by a related test number described in a current test specification out of a plurality of test specifications each defining contents of a test, test numbers being given to the plurality of test specifications, a test number of a related test specification corresponding to the related test being set as the related test number in each of the plurality of test specifications, the related test required to be conducted most recently;
   transmitting test input data to a testing server only when the related test was conducted most recently, the test input data entered from a testing client, the testing server provided with the program and an output processing program describing a process for adding a hash value to test output data of the program, the hash value generated from the program by an algorithm that makes a different hash value when the program is modified;
   determining a test result, pass or fail, by comparing the test output data with an output pattern, the test output data output from the testing server running the program in response to the test input data, the output pattern described in the current test specification; and
   storing a test log in a log memory, the test log including the test result and the hash value generated by the testing server running the output processing program.

2. The test recording method according to claim 1, further comprising comparing the test input data with an input pattern described in the current test specification to find if the test input data meets the current test specification; and
   the wherein the transmitting transmits the test input data to the testing server only when the test input data meets the current test specification.

3. The test recording method according to claim 2, wherein:
   test numbers are given to the plurality of test specifications in order of test execution;
   the comparing specifies the current test specification based on a value of a test number counter and compares the test input data with the current test specification specified; and
   the transmitting transmits the test input data only when the input comparison means produces a match result.

4. The test recording method according to claim 1, wherein:
   test numbers are given to the plurality of test specifications and a test number of a related test specification corresponding to a related test is set as a related test number in each of the plurality of test specifications, the related test required to be conducted before;
   the test recording method further comprising detecting if the related test specified by the related test number has been conducted; and
   the transmitting transmits the test input data only when the input comparison means confirms that the related test has been conducted.

5. The test recording method according to claim 1, further comprising transmitting at least the program and the test log to an acceptance system of a delivery destination in response to a delivery request.

6. The test recording method according to claim 5, wherein the transmitting of the program and the test log encrypts at least the test log with a public key.

7. A test recording device for recording a result of testing a program developed based on prescribed design specifications, comprising:
   a processor; and
   a memory storing computer-readable instructions, execution of the instructions by the processor configuring the processor to include:
   a detection block for detecting if a related test was conducted most recently, the related test specified by a related test number described in a current test specification out of a plurality of test specifications each defining contents of a test, test numbers being given to the plurality of test specifications, a test number of a related test specification corresponding to the related test being set as the related test number in each of the plurality of test specifications, the related test required to be conducted most recently;
   a data transmission block for transmitting test input data to a testing server only when the related test was conducted most recently, the test input data entered from a testing client, the testing server provided with the program and an output processing program describing a process for adding a hash value to test output data of the program, the hash value generated from the program by an algorithm that makes a different hash value when the program is modified;
   an evaluation block for determining a test result, pass or fail, by comparing the test output data with an output pattern, the test output data output from the testing server running the program in response to the test input data, the output pattern described in the current test specification; and
   a result recording block for storing a test log in a log memory, the test log including the test result and the hash value generated by the testing server running the output processing program.

8. A computer-readable recording medium storing a test recording program to record a result of testing a program developed based on prescribed design specifications, the test recording program causing a computer to perform functions including:
  detecting if a related test was conducted most recently, the related test specified by a related test number described in a current test specification out of a plurality of test specifications each defining contents of a test, test numbers being given to the plurality of test specifications, a test number of a related test specification corresponding to the related test being set as the related test number in each of the plurality of test specifications, the related test required to be conducted most recently;
  transmitting test input data to a testing server only when the related test was conducted most recently, the test input data entered from a testing client, the testing server provided with the program and an output processing program describing a process for adding a hash value to test output data of the program, the hash value generated from the program by an algorithm that makes a different hash value when the program is modified;
  determining a test result, pass or fail, by comparing the test output data with an output pattern, the test output data output from the testing server running the program in response to the test input data, the output pattern described in the current test specification; and
  storing a test log in a log memory, the test log including the test result and the hash value generated by the testing server running the output processing program.

* * * * *